United States Patent
Beecroft

(10) Patent No.: US 10,520,911 B2
(45) Date of Patent: Dec. 31, 2019

(54) CONTROL SYSTEMS FOR MACHINES

(71) Applicant: ROLLS-ROYCE plc, London (GB)

(72) Inventor: Peter Beecroft, Wakefield (GB)

(73) Assignee: ROLLS-ROYCE plc, London (GB)

( * ) Notice: Subject to any disclaimer, the term of this patent is extended or adjusted under 35 U.S.C. 154(b) by 142 days.

(21) Appl. No.: 15/243,156

(22) Filed: Aug. 22, 2016

(65) Prior Publication Data

US 2016/0357170 A1 Dec. 8, 2016

Related U.S. Application Data

(63) Continuation of application No. 13/735,411, filed on Jan. 7, 2013, now Pat. No. 9,459,594.

(30) Foreign Application Priority Data

Jan. 24, 2012 (GB) .................................. 1201093.0

(51) Int. Cl.
| | |
|---|---|
| *F02C 9/00* | (2006.01) |
| *G05B 19/12* | (2006.01) |
| *G05B 11/01* | (2006.01) |
| *H05K 7/00* | (2006.01) |

(52) U.S. Cl.
CPC .............. *G05B 19/128* (2013.01); *F02C 9/00* (2013.01); *G05B 11/01* (2013.01); *F05D 2240/40* (2013.01); *G05B 2219/23344* (2013.01); *G05B 2219/25294* (2013.01)

(58) Field of Classification Search
CPC .................. G05B 19/128; G05B 11/01; G05B 2219/25294; F02C 9/00; F05D 2240/40
See application file for complete search history.

(56) References Cited

U.S. PATENT DOCUMENTS

| | | | |
|---|---|---|---|
| 4,280,185 A | | 7/1981 | Martin |
| 4,445,174 A | * | 4/1984 | Fletcher ................ G06F 12/084 |
| | | | 700/5 |
| 5,033,010 A | | 7/1991 | Lawrence et al. |

(Continued)

FOREIGN PATENT DOCUMENTS

EP 2 388 666 A2 11/2011

OTHER PUBLICATIONS

Dec. 17, 2014 European Search Report issued in Application No. EP 13 15 0397.

(Continued)

*Primary Examiner* — Rocio Del Mar Perez-Velez
*Assistant Examiner* — Brian T McMenemy
(74) *Attorney, Agent, or Firm* — Oliff PLC

(57) ABSTRACT

A control system for a machine comprising a plurality of independently replaceable machine modules comprises a controller operable to control operation of the machine. Memory stores machine data for use by the controller. Communication means are operable to provide communication for data transfer between the controller and the memory. The memory includes a plurality of memory modules associated with respective machine modules. Each of the memory modules is replaceable with the respective associated machine module and independently of other memory modules. The communication means is operable to provide communication for data transfer between the controller and a replacement memory module associated with a replacement machine module.

11 Claims, 2 Drawing Sheets

(56) References Cited

U.S. PATENT DOCUMENTS

| | | | | |
|---|---|---|---|---|
| 5,386,363 A | * | 1/1995 | Haak | H02J 13/0062 700/292 |
| 2001/0042225 A1 | * | 11/2001 | Cepulis | G06F 11/006 714/25 |
| 2002/0082746 A1 | | 6/2002 | Schubring et al. | |
| 2003/0187554 A1 | * | 10/2003 | Henry | B64D 41/00 701/29.6 |
| 2006/0155397 A1 | * | 7/2006 | Focke | B65B 19/28 700/83 |
| 2008/0125950 A1 | | 5/2008 | Brown | |
| 2009/0076628 A1 | * | 3/2009 | Smith | G05B 19/4184 700/3 |
| 2009/0143871 A1 | | 6/2009 | Gao et al. | |
| 2009/0192668 A1 | * | 7/2009 | Payne | G07C 5/085 701/33.4 |
| 2009/0326782 A1 | | 12/2009 | Nunn | |
| 2010/0073865 A1 | * | 3/2010 | Hayashi | G06F 1/185 361/679.47 |
| 2010/0076630 A1 | * | 3/2010 | Vian | G07C 5/085 701/14 |
| 2011/0196593 A1 | | 8/2011 | Jiang et al. | |
| 2013/0170498 A1 | * | 7/2013 | Danielsson | H04L 12/4015 370/400 |

OTHER PUBLICATIONS

Mar. 10, 2016 Office Action issued in European Patent Application No. 13 150 397.1.

Jun. 21, 2012 Search Report issued in British Application No. 1201093.0.

Sep. 23, 2012 Search Report issued in British Application No. 1201093.0.

Feb. 27, 2015 Office Action issued in U.S. Appl. No. 13/735,411.

* cited by examiner

CONTROL SYSTEMS FOR MACHINES

This is a Continuation of U.S. application Ser. No. 13/735,411 filed on Jan. 7, 2013, which claims the benefit of Great Britain Patent Application No. 1201093.0 filed on Jan. 24, 2012. The disclosure of the prior application is hereby incorporated by reference herein in its entirety.

The present invention relates to improvements in or relating to control systems for machines. The examples described are applicable to machines which comprise a plurality of independently replaceable machine modules.

One example of a machine which comprises a plurality of independently replaceable machine modules is a gas turbine engine. In many gas turbine engine designs, the various modules of the system can be replaced, repaired or upgraded independently from the other modules forming the system. For example, the engine may be designed to allow the engine core to be replaced ("swapped out") independently of the fan case, fan set or other modules. Additionally, individual elements of the engine core, such as turbines, may be independently replaceable and thus can each be considered to be one of the modules of the machine.

In other examples, such as in an industrial plant, individual elements of the plant may be replaced, serviced or upgraded independently of the rest of the plant and thus can be considered as one module of the industrial plant. A pump forming part of the industrial plant is an example of an element which may be replaced, serviced or upgraded in a modular fashion in this way.

Complex machines, such as gas turbine engines, require control systems to ensure proper operation of the machine. Typically, control systems have a memory for data relating to the machine, for use by control algorithms implemented by the control systems.

Examples of the present invention provide a control system for a machine comprising a plurality of independently replaceable machine modules, the system comprising:
  a controller operable to control operation of the machine;
  memory for storing machine data for use by the controller; and
  communication means operable to provide communication for data transfer between the controller and the memory;
  wherein the memory includes a plurality of memory modules associated with respective machine modules,
  and wherein each of the memory modules is replaceable with the respective associated machine module and independently of other memory modules; and
  wherein the communication means is operable to provide communication for data transfer between the controller and a replacement memory module associated with a replacement machine module.

This provides the advantage that data can remain with the associated modules as modules are swapped out. Data related to the modules which are actually present is always available to the controller. Consequently, the algorithms which are run by the controller can be based on the data related to the modules which are actually present, and the controller can maintain and update the data so that it continues to reflect the operational history of the modules which are actually present.

The memory modules may be mounted with the respective associated machine modules to cause the memory modules to be removed and replaced when respective associated machine modules are removed and replaced. The memory modules may be carried by the respective associated machine modules. Alternatively, the memory modules may be mounted independently of the respective associated machine modules.

The controller may be replaceable independently of the memory modules or machine modules, and the communication means may be operable to provide communication for data transfer between the memory modules and a replacement controller.

The controller may use the memory modules for storage of data specific to the respective associated machine module. The specific data may relate to the identity, type, version, history, calibration, trim and/or deterioration through use of the associated machine module.

The machine may be a gas turbine engine. The control of the machine by the controller may be dependent, at least in part, on data retrieved by the controller from one or more memory modules.

Examples of the present invention also provide a machine comprising:
  a plurality of independently replaceable machine modules;
  a controller operable to control operation of the machine modules;
  a plurality of memory modules associated with respective machine modules and replaceable independently of other memory modules when the respective associated machine module is replaced;
  and communication means operable to provide for data transfer between the controller and the memory modules of the machine modules currently forming the machine.

The machine may comprise any feature or combination of features of the control system as set out above.

Examples of the present invention also provide a method of storing data relating to a machine which comprises a plurality of independently replaceable machine modules, in which:
  a plurality of memory modules are provided, associated with respective machine modules and each replaceable with the respective associated machine module and independently of the other memory modules;
  and in which the memory modules are used for storage of data specific to the respective associated memory modules.

The specific data may be operational performance data.

Examples of the present invention provide a control system for a machine comprising a plurality of independently replaceable machine modules, the system comprising:
  a controller operable to control operation of the machine;
  memory for storing machine data for use by the controller;
  communication means operable to provide communication for data transfer between the controller and the memory;
  wherein the controller is replaceable independently of the memory; and
  wherein the communication means is operable to provide communication for data transfer between the memory and a replacement controller.

The control system may comprise any feature or combination of features of the control system as set out above.

Examples of the present invention will now be described in more detail, by way of example only, and with reference to the accompanying drawings, in which.

Examples of the present invention can be implemented as and in conjunction with gas turbine engines. Accordingly, it is appropriate first to describe a gas turbine engine.

Figure 1:
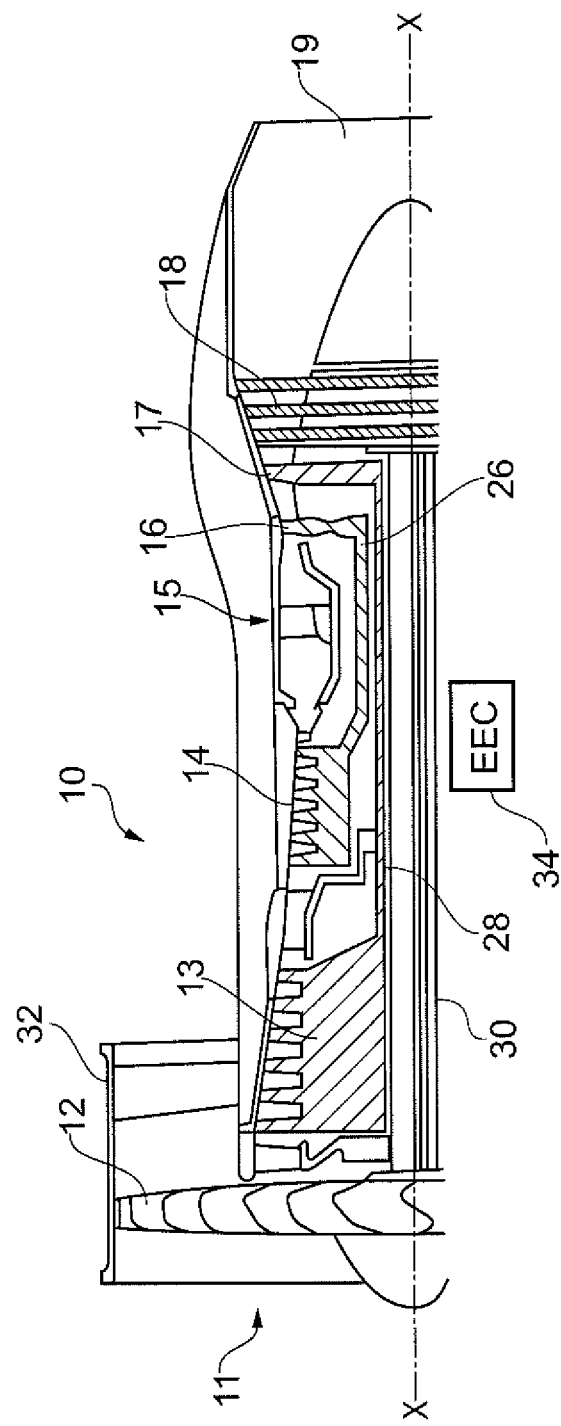
FIG. 1 is a section along the axis of the gas turbine engine of a type with which a control system according to examples of the invention can be used.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

The fan 12 is surrounded by a fan casing 32.

Operation of the engine 10 is controlled by a computerised control system 34, here termed an Electronic Engine Controller (EEC). The EEC 34 provides master control within the engine 10 and is in communication with subsidiary control systems (not shown) associated with various functions around the engine, such as fuel metering systems, controlling tip clearance around turbine blades, systems controlling fan settings, and systems controlling other processes. The EEC 34 receives data from around the engine, representing current engine parameters such as gas temperatures, shaft speeds, tip clearance etc. The EEC 34 also has access to data representing trims required in various operating conditions for engine components such as the fan 12, compressors 13, 14, turbines 16, 17, 18 and others. The data available to the EEC 34 is used by it to implement control algorithms intended to optimise the operation of the engine 10.

The engine 10 is designed to be modular in use, allowing various modules of the system to be replaced, repaired or upgraded independently from the other modules forming the engine 10, as noted above. For example, the engine core (the compressors 13, 14, combustor 15 and turbines 16, 17, 18) may be replaceable independently of the fan 12 and the fan casing 32. Additionally, individual elements of the engine core, such as the compressors 13, 14 and the turbines 16, 17, 18 may be replaceable independently of other structures and thus can be considered to be modules of the engine 10. Other independently replaceable modules include the fan 12 and the fan casing 32, the engine gearbox (not visible in FIG. 1) and accessories such as the fuel metering unit and engine sensors Having described the engine 10 and the modular nature of it, attention is now drawn to FIG. 2, which illustrates a generic machine 36 which is also modular in construction. In this example, the machine 36 has three modules 38 labelled Mod 1, Mod 2 and Mod 3. The modules 38 are independently replaceable machine modules. Thus, the module 38, labelled Mod 1, can be replaced by a corresponding module as part of a process of repair or maintenance of the machine 36. This allows a worn or degraded module 38 to be replaced without the other modules of the machine 36. After replacement, the machine 36 still has three modules 38 of the types Mod 1, Mod 2 and Mod 3. A module 38 may also be replaced in this way for upgrading the machine 36, for example by replacing one of the modules 38 with an equivalent but upgraded version.

The machine 36 is controlled by a control system which comprises a controller 40 operable to control operation of the machine 36. Memory 42 is provided for storing machine data for use by the controller 40. Communication means indicated at 44 are operable to provide two-way communication for data transfer between the controller 40 and the memory 42, allowing data to be stored and retrieved. Communication means 45 are provided for communication of control instructions from the controller 40 to the modules 38, and for collection of data from sensors associated with the modules 38. The communication means 44, 45 may be implemented by any wired or wireless technique which is appropriate for the environment within the machine 36. Appropriate control algorithms are executed by the controller 40, based on data retrieved from the memory 42. Data in the memory 42 is also updated by the controller 40 to reflect the operational history of the machine 36.

The memory 42 includes a plurality of memory modules 46 each associated with a respective machine module 38. In a manner which will be described, each of the memory modules 46 is replaceable with the respective associated machine module 38 and independently of other memory modules 46. The communication means 44 is operable to provide communication for data transfer between the controller 40 and a replacement memory module 46 associated with a replacement machine module 38. This allows the controller 40 to retrieve data which is specific to those machine modules 38 which are actually present, and the controller 40 can maintain and update the data in each memory module 46, so that it continues to reflect the operational history of the associated machine module 38. Thus, the data available for the controller algorithms represents the operational history of the actual modules which are currently present.

Figure 2:
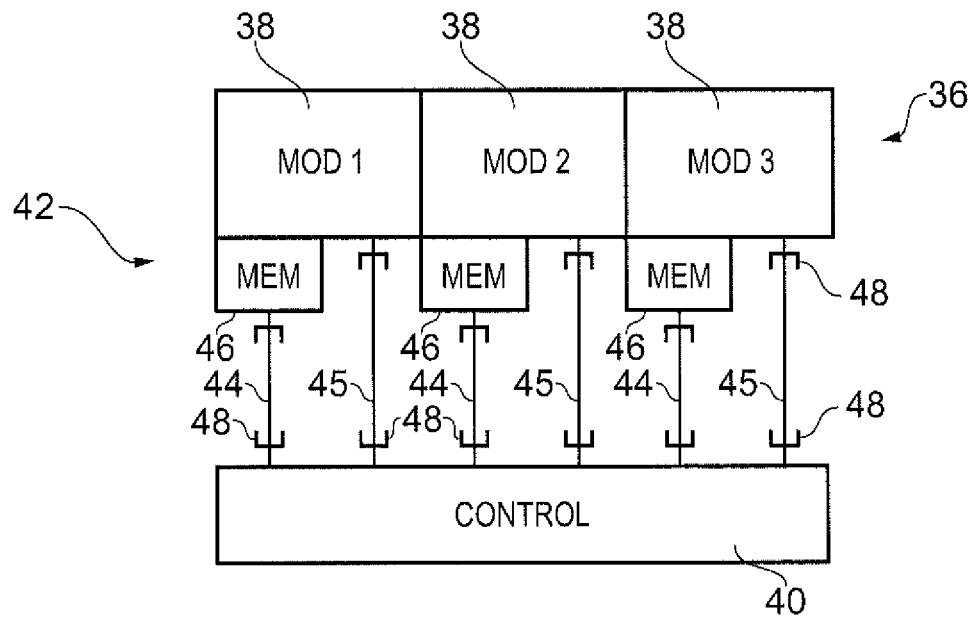
FIG. 2 is a highly schematic block diagram of a machine incorporating a control system according to one example of the invention being described.

In more detail, the memory modules 46 are each mounted with the respective associated machine module 38, as indicated schematically in FIG. 2 by the adjacency of the memory module 46 and the associated machine module 38. In one example, the memory modules 46 may be mounted in or on the machine modules 38. If the memory modules 46 are carried by the machine modules 38 in this way, they can readily be removed and replaced when the associated machine module 38 is removed and replaced by a replacement module 38, containing an associated memory module 46. In another example, the memory modules may be mounted independently of the respective associated machine module, in a manner which allows them to be removed and replaced independently of the other memory modules, so that when a machine module is swapped out, the corresponding memory module can also be swapped out.

In addition, the controller 40 of this example is replaceable independently of the machine modules 38 or memory modules 46. The communication means 44 are operable to provide communication for data transfer between the memory modules 46 and a replacement controller 40. The communication means 45 are operable to provide communication between the machine modules 38 and a replacement controller 40.

The ability for independent replacement of the modules 38, 46 and the controller 40 is schematically illustrated in FIG. 2 at 48, to indicate connectors of appropriate form for forming a disengageable connection between the communication means 44, 45 and the modules 38, 46 and controller 40. Thus, if one of the machine modules 38 and the associated memory module 46 is to be replaced, the connectors 48 through which that module 38 and the module 46 are connected respectively to the communication means 45 and the communication means 44 are disengaged from the modules 38, 46 which are being replaced, and reconnected with the replacement modules 38, 46, as part of the installation process. In the case of any wireless communication means, the connections 48 will represent the making of a wireless connection, rather than a physical connector.

During operation of the machine 36, the controller 40 executes control algorithms based on data available to it, issuing appropriate control instructions to the machine modules 38 through the communication means 45. The data available to the controller 40 will include live performance data reported back from the machine modules 38 over the communication means 45 and may also include additional data derived from other sensors (not shown) around the machine 36. The controller 40 also has access to each of the memory modules 46. The memory modules 46 are used to contain data specific to the respective associated machine module 38. Thus, the specific data stored in the memory modules 46 may relate to the history, calibration, trim and/or deterioration through use of the associated machine module 38. For example, details of the history of the associated machine module 38 may allow the controller 40 to place operational limits on the machine 36, related to the age of the module 38. Calibration data stored in the memory module 46 and specific to the associated machine module 38 allows the controller 40 to execute control algorithms more effectively than if generalised calibration data was assumed. Similarly, trim data and/or deterioration data which is specific to the particular associated machine module 38 allows the controller 40 to execute control algorithms more effectively.

The effectiveness of the controller 40 and the control algorithms is maintained throughout maintenance, repair and upgrading operations, as follows. In the event that a machine module 38 is to be replaced, the module 38 is removed from the machine 36. The associated memory module 46 is also removed, as noted above. When a replacement module 38 is installed, along with an associated replacement memory module 46, the communication means 44, 45 provide access for the controller 40 to the replacement memory module 46 and also to the replacement machine module 38, as noted above. Accordingly, the controller 40 now has access to data specific to the replacement machine module 38, such as history, calibration, trim and/or deterioration data relating specifically to the replacement machine module 38. In the event that the replacement machine module 38 is an upgraded version of the module, data such as calibration and trim data may be significantly different to the data contained in the replaced memory module 46. Similarly, the controller 40 also has access to live performance data reported back from the replacement machine module 38.

The controller 40 is able to control the machine 36 on the basis of data relating to the modules 38 which are actually present, including any data relating to the history of those modules. The controller 40 is also able to maintain and update the data, particularly in relation to the operational history of each of the modules 38.

In similar manner, the controller 40 can be replaced by a replacement controller 40, which will have immediate access to the machine modules 38 and the memory modules 46 through the communication means 45, 44 and will thus have immediate access to data specific to the particular machine modules 38 which are actually present. Access to this data is available immediately the controller 40 is installed, through the communication means 44, 45, without any updating of the controller 40 being required as part of the installation process. In one example, a controller 40 may be replaced with an upgraded controller 40, such as a controller executing improved control algorithms. The improved control algorithms can immediately be applied to data specific to the particular machine modules 38 which have been installed.

It will be apparent from a full understanding of the above description that the principles underlying the machine of FIG. 2 can be applied in many different circumstances and in many different complex systems, such as complex machines, industrial plant and other circumstances.

Figure 3:
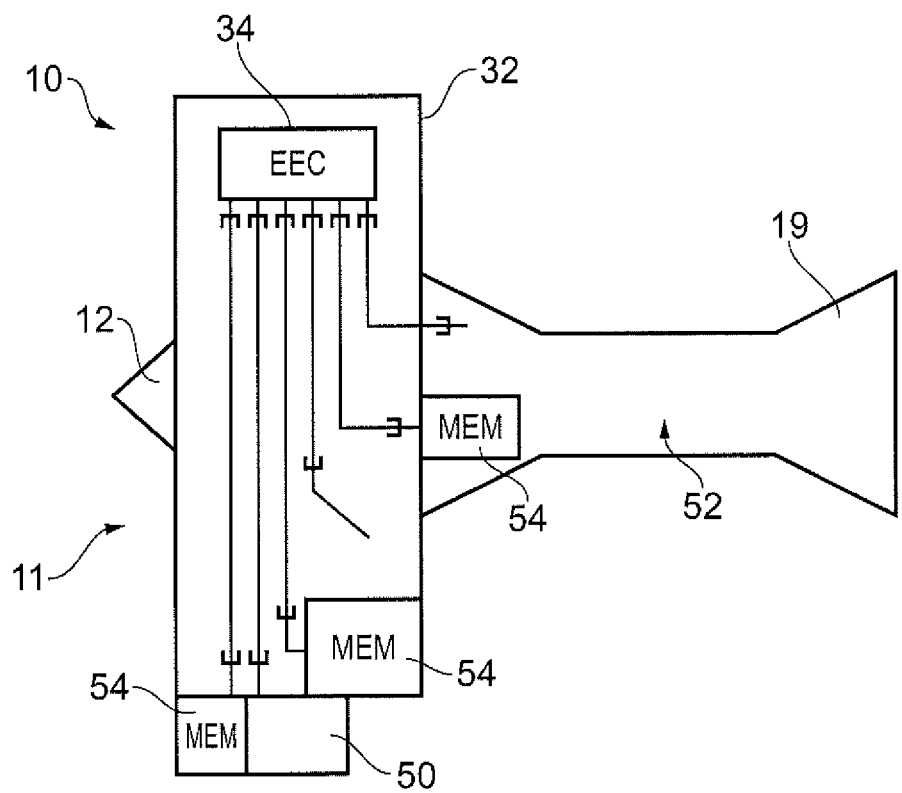
FIG. 3 is a highly schematic diagram of a gas turbine engine incorporating a control system according to an example of the invention being described.

Having described the machine 36, the application of these principles to a gas turbine engine as illustrated in FIG. 3 can now be described. The engine illustrated in FIG. 3 is the same as the engine 10 of FIG. 1 and is thus given the same reference numerals, but is illustrated more schematically in FIG. 3.

The engine 10 comprises a plurality of independently replaceable machine modules, as has been described. In this example, the replaceable machine modules are the fan casing 32, an engine accessory 50 (such as a fuel metering, monitoring or delivery system) and the engine core 52. The engine 10 is controlled by a system which comprises the EEC 34, which is operable to control operation of the engine 10. Memory in the form of memory modules 54 is used for storing engine data for use by the EEC 34. Communication means equivalent to the communication means 44 and 45 of FIG. 2, and thus given the same reference numerals, provide communication for data transfer between the EEC 34 and the memory modules 54. In the same manner as described above in relation to FIG. 2, the memory modules 54 are associated with respective replaceable engine modules 32, 50, 52. Each of the memory modules 54 is replaceable with the respective associated engine module 32, 50, 52 and independently of other memory modules 54. The communication means 44, 45 are operable to provide communication for data transfer between the EEC 34 and a replacement memory module 54 associated with a replacement engine module 32, 50, 52.

Replacement of the engine modules and memory modules is achieved by the use of disengageable connections 48, in the manner described above in relation to FIG. 2.

During operation of the engine 10, the EEC 34 executes control algorithms based on data available to it from the engine modules 32, 50, 52 and from the memory modules 54. The data available to the EEC 34 will include operational performance data, such as live performance data reported back from the engine modules 32, 50, 52 and may also include additional data derived from other sensors (not shown) around the engine 10. The EEC 34 also has access to data contained within the memory modules 54, which is specific to the associated engine modules 32, 50, 52, such as history, calibration, trim and/or deterioration data. This allows effective use of control algorithms by the EEC 34, as noted above. In the event that one of the engine modules 32, 50, 52 is replaced during maintenance, repair or upgrading operations, the associated memory module 54 is also removed and when a replacement engine module 32, 50, 52 is installed, an associated replacement memory module 54 will also be installed, containing the relevant data specific to the replacement engine module 32, 50, 52, such as history, calibration, trim and/or deterioration data. This will be true even if the replacement engine module is an upgraded version. Consequently, the EEC 34 is immediately able to implement control algorithms based on this specific data. The EEC 34 is also able to maintain and update the specific data so that it continues to reflect the operational history of the associated engine module.

In similar manner, the EEC 34 can be replaced by a replacement EEC, which may be an equivalent unit or an upgraded version such as a version with upgraded engine control algorithms. The replacement EEC 34 will have immediate access to all of the information available to the replaced EEC, including the data specific to the engine modules 32, 50, 52 contained in the memory modules 54, without any updating of the replacement EEC 34 being required as part of the installation process.

CONCLUDING COMMENTS

The examples described above provide for persistence of data within the machine or engine, even when modules are swapped into or out of the system. Thus, if a controller is swapped, data relating to the other modules of the system remains (in the memory modules). Conversely, if a module is removed, specific data relating to that module is brought with it in the associated memory module. Moreover, if a module which has been swapped out of a machine or engine is subsequently introduced into another machine or engine, it will carry with it its associated memory module and contents, thus introducing the specific data into the new system.

As will have been understood above, the EEC or other controlling computer has access to data relating to the individual engine or machine modules of the system, from the memory associated with them. This can be useful in adjusting the control of the system or in reporting the system configuration and in computing the life of these engine modules. With appropriate algorithms, the controlling computer is able to adjust the manner in which it controls the system, allowing system performance to be optimised while accounting for module deterioration, replacement or other system changes. This is expected to allow for the system to be controlled in such a way as to improve or retain efficiency, improve lifetimes of systems and modules, reduce maintenance costs etc. Each time a module is swapped into or out of a system, the controlling computer of the old and new systems can immediately adjust their operation in an appropriate manner for the latest configuration of the engine or machine. Similarly, the controlling computer can be swapped in or out with no loss of system or module data and no need for manual updating of this data by the user, allowing the new controlling computer to continue operating the system in an appropriate manner for its configuration and level of deterioration.

It is envisaged that the memory modules are implemented as memory devices with minimal or no local computational intelligence, allowing them to be formed robustly and thus allowing them to be located in harsh environments within an engine or other machine.

Various specific examples of the manner of use of the apparatus described above can be mentioned. For example, control of tip clearance around the turbine blades is important for ensuring efficient operation of a gas turbine engine, and tip clearance can be affected by a number of different factors, including operating conditions and operating history. The examples described above allow details of the operating history to be stored in a memory module associated with a turbine module so that this history can be incorporated into any control algorithms used to control tip clearance. Similarly, calibration and trim data specific to the particular turbine module can also be stored in the memory module. The data contained within the memory module, particularly any history data, can be updated during operation. All of this data remains within the engine for use by a replacement EEC, or will travel with the turbine module to be available to the EEC of a new engine into which the turbine module is subsequently installed.

Other examples of modules include key accessories such as fuel pumps and fuel metering units. Fan casings, fans, compressors, combustors and turbines have also been mentioned above. For optimal execution of control algorithms, an EEC controlling a gas turbine engine must have access to data associated with the individual modules, such as thrust trims which relate to the fan, trims to turbine gas temperature relating to the compressors, combusted and turbines, and fuel trims related to the fuel pump and fuel metering unit. In the arrangements described above, all of this data persists within the engine, while any particular engine module is installed, so that it is immediately available to any EEC or replacement EEC and in particular, there is no requirement for this type of data to be manually programmed into a replacement EEC.

Part of the operation of the EEC or other controller may be to assess deterioration occurring within the module during operation, and to update the data stored in the memory module associated with the engine module, for future use. For example, deterioration in compressors may require adjustment to bleed valve schedules or variations in geometry in order to maintain performance and efficiency. Calibration data relating to engine modules can be stored, assessed and modified during the life of the module, for example to adjust calibration to accommodate wear or other forms of deterioration.

Furthermore, the EEC or other controller may make use of the data within the memory modules to assess and impose limits on operation parameters, such as the maximum thrust available from a gas turbine engine, thus allowing the engine to be rated according to the particular combination of engine modules currently installed, and allowing the engine to be de-rated as those modules age.

Although embodiments of the present invention have been described in the preceding paragraphs with reference to various examples, it should be appreciated that modifications to the examples given can be made without departing from the scope of the invention as claimed. Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a machine comprising:
 a plurality of independently replaceable machine modules, each machine module comprising hardware for performing an operation of the machine;
 a controller configured to directly control an operation of the machine modules; and
 a non-transitory computer readable memory configured to store machine data for use by the controller and configured to receive data from the controller, the memory including a plurality of memory modules, wherein each of the memory modules:
  (1) comprises a memory circuit for storing data;
  (2) is associated with a respective machine module;
  (3) is in direct two-way communication with the controller;
  (4) is removed and replaced when the respective associated machine module is removed and replaced; and
  (5) is removed and replaced independently of other memory modules of the plurality of memory modules,
 wherein:
  the controller receives operational history data of an operational history of each machine module directly from the respective machine modules associated with the respective associated memory modules and then transfers the operational history data to the respective memory modules,
  the controller is replaceable independently of the memory modules by another controller configured to receive data from the memory; and
  data stored in the memory is updated by the controller to reflect an operational history of the machine,
 wherein at least one of the memory modules is mounted with the respective associated machine module to cause the memory module to be removed and replaced when the respective associated machine module is removed and replaced, and
 wherein at least one of the memory modules is mounted independently of the respective associated machine module.

2. The control system of claim 1, wherein each machine module comprises a fan, a fan casing, a fuel pump, a compressor, a combustor, a turbine, or a fuel metering/monitoring/delivering system.

3. The control system of claim 1, wherein the controller is an electronic engine controller (EEC) and the replacement controller is an EEC.

4. The control system of claim 1, wherein the memory module is carried by the respective associated machine module.

5. The control system of claim 1, wherein the controller is replaceable independently of the memory modules or machine modules, and wherein communication means are operable to provide communication for data transfer between the memory modules and a replacement controller.

6. The control system of claim 1, wherein the controller is operable to use the memory modules for storage of data specific to the respective associated machine module and the specific data relates to the identity, type, version, history, calibration, trim, and/or deterioration through use of the associated machine module.

7. The control system of claim 1, wherein the machine comprises a gas turbine engine.

8. The control system of claim 1, wherein the control of the operation of the machine by the controller is dependent, at least in part, on data retrieved by the controller from one or more memory modules.

9. A method of storing data relating to a machine which comprises a plurality of independently replaceable machine modules, each machine module comprising hardware for performing an operation of the machine, the method comprising:
 providing a plurality of memory modules, each comprising a memory circuit for storing data, each associated with a respective machine module, wherein at least one of the memory modules is mounted with the respective associated machine module to cause the memory module to be removed and replaced when the respective associated machine module is removed and replaced, and wherein at least one of the memory modules is mounted independently of the respective associated machine module;
 using the memory modules for storage of data specific to the operational history of the respective associated memory modules; and
 maintaining the data specific to the operational history of the respective associated memory modules within the memory modules to enable a first controller of a first machine in which respective machine modules are placed to operate the respective machine modules based on the operational history of the respective machine modules and, when the respective machine module are removed from the first machine, to enable a second controller of a second machine in which the respective machine modules are placed to operate the respective machine modules based on the operational history of the respective machine modules.

10. The method of claim 9, wherein the specific data comprises operational performance data.

11. A control system for a machine comprising:
 a plurality of independently replaceable machine modules, each machine module comprising hardware for performing an operation of the machine;
 a controller configured to control an operation of the machine;
 a non-transitory computer readable memory configured to store machine data for use by the controller, the machine data related to the plurality of machine modules, the memory including a plurality of memory modules, each memory module comprising a memory circuit for storing data; and
 a communication means for communicating: (i) a data transfer between the controller and the memory, and (ii) a data transfer between the memory and a second controller, wherein:
  the controller is replaceable independently of the memory;
  the controller is configured to:
   maintain the machine data within respective memory modules to enable the controller to operate the respective machine modules based on the machine data, wherein, when the respective machine modules are removed from the machine and placed in a second machine, a second controller of the second machine is configured to operate the respective machine modules based on the machine data of the respective machine modules;

receive operational history data of an operational history of each machine module directly from the respective machine modules associated with the respective associated memory modules and then transfers the operational history data to the respective memory modules; and data stored in the memory is updated by the controller to reflect an operational history of the machine.

\* \* \* \* \*